United States Patent [19]

Ishimoto

[11] Patent Number: 5,256,500
[45] Date of Patent: Oct. 26, 1993

[54] BATTERY HAVING LIFETIME INDICATOR
[75] Inventor: Shin-ichi Ishimoto, Itami, Japan
[73] Assignee: Mitsubishi Denki Kabushiki Kaisha, Tokyo, Japan
[21] Appl. No.: 822,949
[22] Filed: Jan. 21, 1992
[30] Foreign Application Priority Data
Jan. 28, 1991 [JP] Japan .................................. 3-008560
[51] Int. Cl.$^5$ .......................................... H01M 10/48
[52] U.S. Cl. ........................................ 429/93; 429/91; 429/92
[58] Field of Search ...................... 429/91, 92, 7, 8, 93

[56] References Cited

U.S. PATENT DOCUMENTS

| | | |
|---|---|---|
| 1,497,388 | 6/1924 | Sterling . |
| 3,773,563 | 11/1973 | Eaton, Jr. et al. ..................... 429/91 |
| 4,329,406 | 5/1982 | Dahl et al. . |
| 4,379,816 | 4/1983 | Mullersman et al. .................. 429/91 |
| 4,497,881 | 2/1985 | Bertolino ............................. 429/91 |
| 4,917,973 | 4/1990 | Yoshimoto et al. .................... 429/91 |

FOREIGN PATENT DOCUMENTS

| | | |
|---|---|---|
| 0112248 | 6/1985 | Japan .................................. 429/91 |
| WO9002432 | 3/1990 | PCT Int'l Appl. . |

OTHER PUBLICATIONS

Patent Abstracts of Japan, vol. 8, No. 99 (E-243), May 10, 1984, and JP-A-59-016-283, S. Sekido, et al., "Battery".

Patent Abstracts of Japan, vol. 10, No. 50 (E-384), Feb. 27, 1986, and JP-A-60-205-968, M. Akamatsu, "Discharge End Display Mark of Dry Battery".

Patent Abstracts of Japan, vol. 6, No. 234 (E-143), Nov. 20, 1982, and JP-A-57-134-869, S. Hidaka, "Power Supply".

Patent Abstracts of Japan, vol. 12, No. 493 (E-697) (3340), Dec. 22, 1988, and JP-A-63-205-065, Aug. 24, 1988, Y. Teranishi, "Storage Battery".

*Primary Examiner*—John S. Maples
*Attorney, Agent, or Firm*—Oblon, Spivak, McClelland, Maier & Neustadt

[57] ABSTRACT

An battery comprises an battery unit and a life time indicator for indicating the life time of said battery unit. The life time indicator includes an indication element having a characteristic which indication of the indication element changes according to a voltage impressed onto the same. When voltage drop is caused in the battery unit, the indication of the indication element changes accordingly.

8 Claims, 8 Drawing Sheets

BATTERY HAVING LIFETIME INDICATOR

BACKGROUND OF THE INVENTION

Field of the Invention

The present invention relates to a battery, in particular, to a battery comprising a life time indicator which indicates the life time (voltage drop) of the same.

Description of the Prior Art

Figure 1:
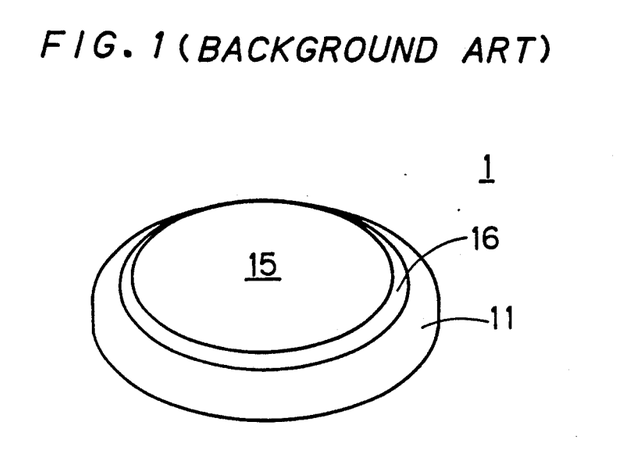
FIG. 1 is a perspective view of a conventional lithium battery.
Figure 2:
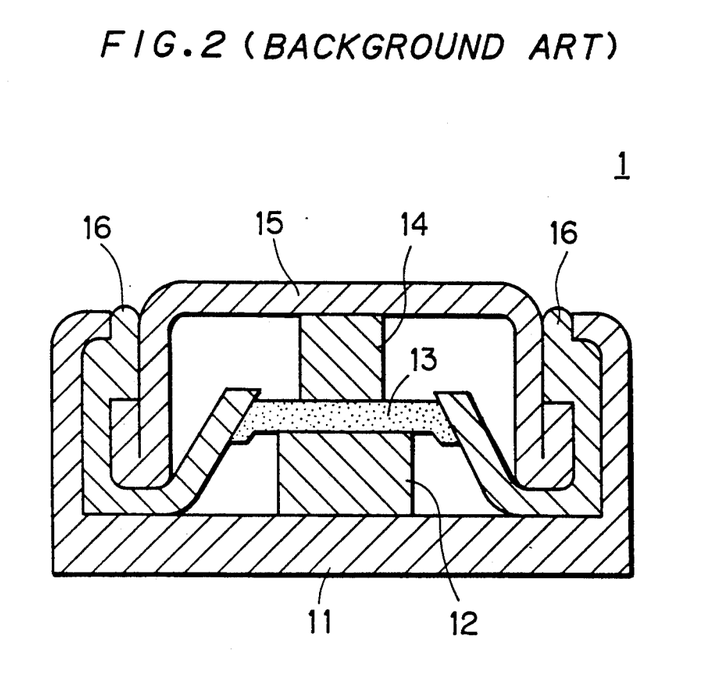
FIG. 2 is a cross sectional view of the conventional lithium battery of FIG. 1.

FIG. 1 is a perspective view of a conventional lithium battery. FIG. 2 is a cross sectional view of the same. In FIG. 2, the lithium battery 1 includes a positive pole container 11 of stainless steel in which a positive pole 12, a separator 13 and a negative pole 14 are layered in that order. The positive pole 12 is made of manganese dioxide. The separator 13 is made of conductive material including electrolytic solution such as conductive polymer. The negative pole 14 is made of lithium. On the negative pole 14, a negative pole container 15 is placed. The negative pole container 15 and the positive pole container 11 firmly hold therebetween the layered assembly which consists of the positive pole 12, the separator 13 and the negative pole 14. A gasket 16 is inserted in the space between the positive container 11 and the negative container 15 so that the lithium battery 1 is completely sealed. At the same time, the gasket 16 attains insulation between the positive container 11 and the negative container 15.

Figure 3:
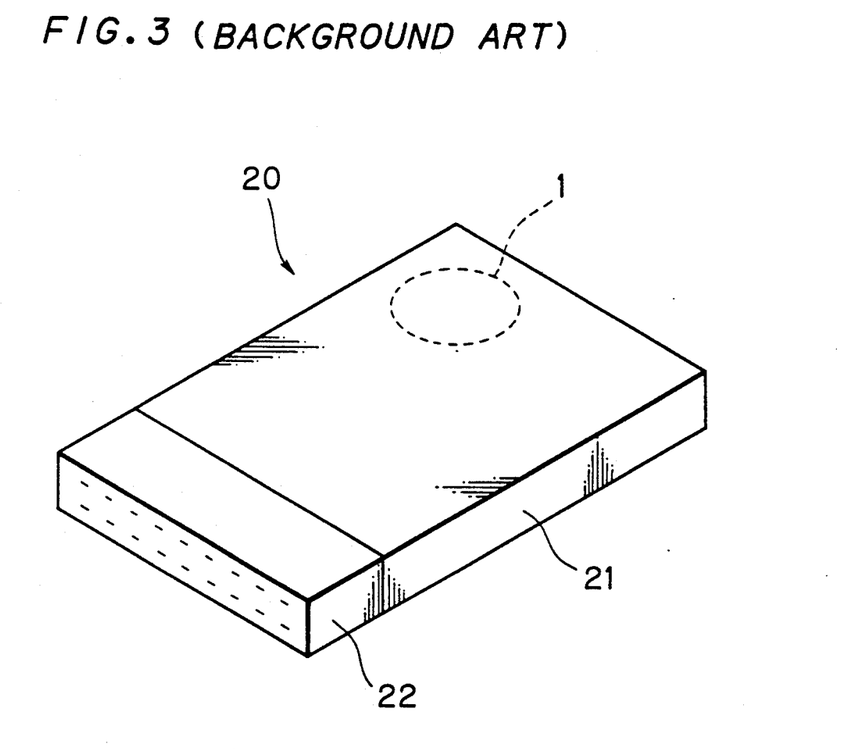
FIG. 3 is a perspective view of a memory card incorporating the lithium battery of FIG. 1.

The lithium battery 1 is employable within a memory card body 21 as shown in FIG. 3, for example. When thus incorporated in a memory card 20, the lithium battery 1 performs a back up function. In FIG. 3, the portion with a reference number 22 is a connector.

In the memory card 20, a backup power source, namely, the lithium battery must always have an electric potential of a certain level or over to keep information contained therein stored. For this reason, there arises the need to regularly measure voltage drop of the lithium battery 1 to know the life time thereof. For instance, assuming that a consumption current in a static random access memory (not shown) of the memory card 20 is I(t) at a temperature of t, the life time LT of the lithium battery 1 is given by $$LT = Q/I(t)$$

where Q is a charge capacity of the lithium battery 1. In most cases, the charge capacity Q of the lithium battery 1 which is employable in the memory card 20 is around 165 mAH, and a consumption current I(20) of the SRAM is 17 μA at the room temperature t of 20° C. Hence, under the condition of t=20° C., the lithium battery 1 has the life time of $$LT = 265\ mAH/17\ \mu A$$
$$= 9705.8\ H$$

Thus, the lithium battery 1 must be exchanged in about 1.1 year. In addition, as well known in the art, the consumption current I(t) of the SRAM increases with increase in the temperature t. Assuming that the temperature t is 50° C., the consumption current I(50) becomes 85 μA. Hence, the life time LT of the lithium battery 1 is $$LT = 165\ mAH/85\ \mu A$$
$$= 1941\ H$$

Thus, the exchange of the lithium battery 1 for a new one must be made in about 0.22 year. For this reason, where the lithium battery 1 is employed as a backup power source within the memory card 20, regular measurements of voltage drop in the lithium battery 1 are necessary to know when to exchange the lithium battery 1.

The conventional lithium battery 1 does not comprise means for indicating its life time or to what degree its voltage has dropped. Instead, a voltage measurement apparatus is widely used to measure the voltage drop. However, such measurement is not satisfactory because the measurement of the voltage drop is rather complicated. To deal with this, a lithium battery in which an apparatus for indicating life time is integrated is needed, which obviously has not been attained yet. Aside from lithium batteries, other batteries such as manganese batteries and nickel cadmium batteries have similar unfulfilled demands. Thus, an integrated battery which includes an apparatus for indicating the life time is desired in the art.

SUMMARY OF THE INVENTION

The present invention is directed to a battery, the battery comprising: a battery unit including a power source for generating electric power, positive and negative containers connected to the power source, and an insulating member inserted between the positive and negative containers for attaining insulation therebetween; and a life time indicator provided on the battery unit for indicating the life time of the battery unit.

The life time indicator may comprise: an indication element having first and second electrodes, the indication element having a characteristic to indicate changes in the indication element according to a voltage gap between the first and second electrodes; first connection means for connecting the first electrode to the positive container; and second connection means for connecting the second electrode to the negative container.

According to an aspect of the invention, the life time indicator has an external thread portion, while the battery unit has an internal thread portion, the external and internal thread portions being engageable with each other.

Accordingly, an object of the present invention is to provide a battery in which the life time of the battery can be known.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 4:
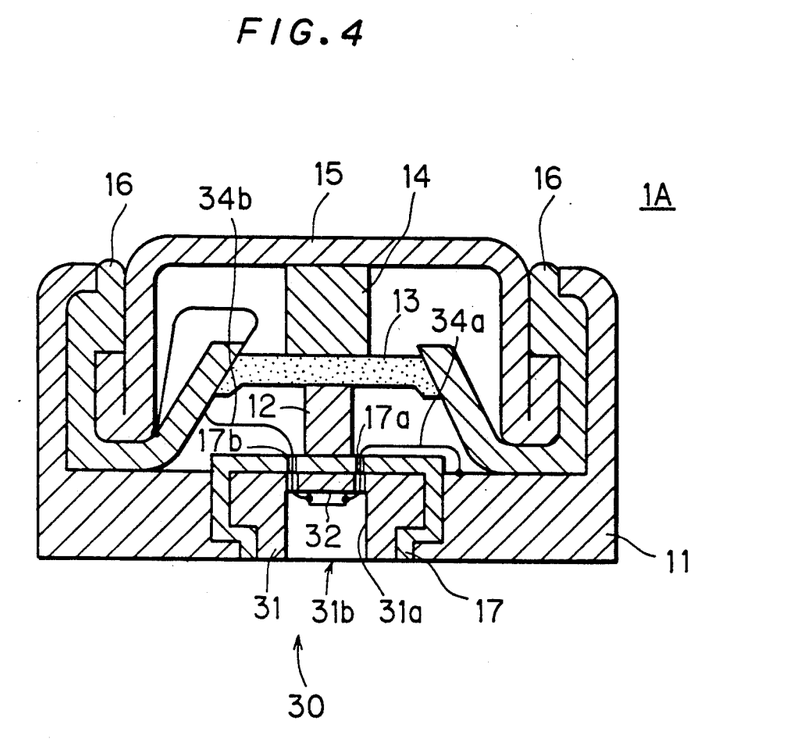
FIG. 4 is a cross sectional view of a battery according to an embodiment of the present invention.

FIG. 4 is a cross sectional view of a battery 1A according to an embodiment of the present invention. The major difference, which lithium battery 1A shows against the conventional battery of FIG. 2, is that it comprises a life time indicator 30 provided in the bottom portion of a positive container 11. The life time indicator 30 for indicating the life time of the battery 1A includes a block member 31 which has a configuration that allows it to be integrated with the positive container 11 through insulating seal member 17 (FIG. 4). According to this embodiment, in particular, the block member 31 is precisely engageable with the positive container 11 lest any portion of the life time indicator 30 should protrude from the positive container 11. However, as long as the lithium battery 1A is steadily sealed, the configuration of the block member 31 is not limited to this. Neither is the material of the block member 31.

Figure 5A:
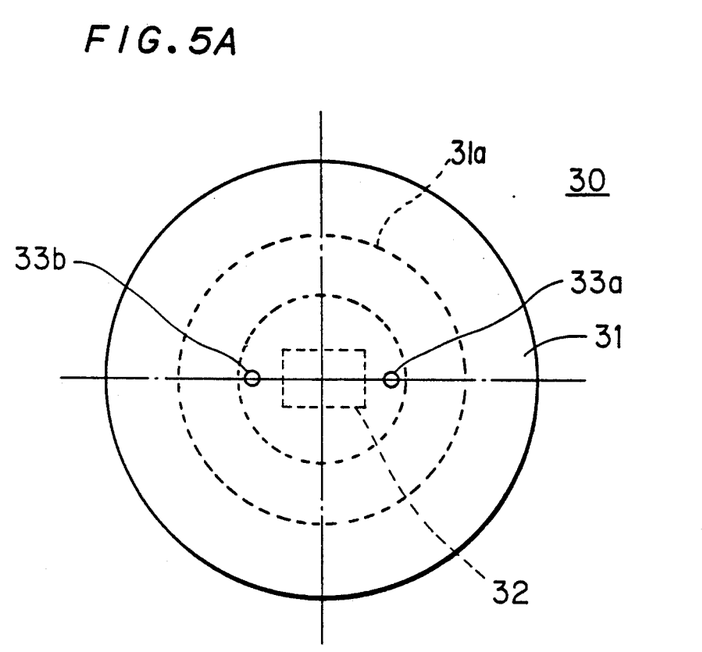
FIGS. 5A and 5B are diagrams of a life time indicator.
Figure 5B:
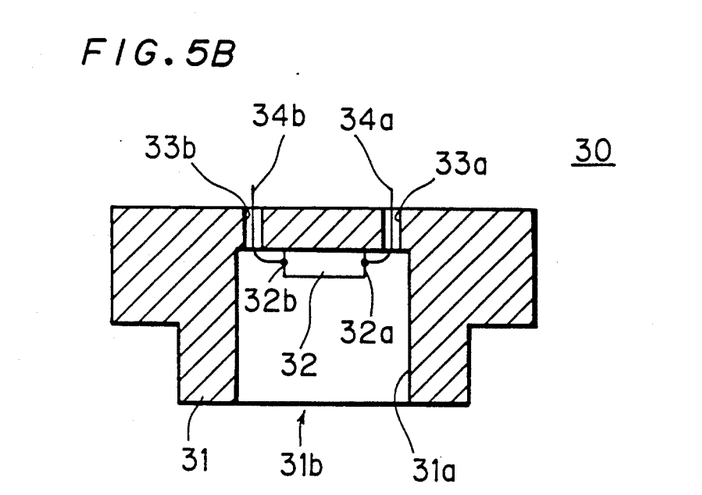

The block member 31 has a recess 31a as shown in FIGS. 5A and 5B. An indication element 32 is fixed to the bottom of recess 31a. The indication element 32 varies its indications depending on a voltage impressed onto the same. Thus, indications of the indication element 32 can be observed through an opening 31b of the recess 31a. The indication element 32 will be described in detail regarding structural and operational aspects.

The recess 31a of the block member 31 has, at its bottom portion, through holes 33a and 33b bored therein. Through the through hole 33a and a through hole 17a of the seal member 17, a covered lead wire 34a provided therein electrically connects an end portion 32a of the indication element 32 and the positive pole container 11. Likewise, another covered lead wire 34b electrically connects another end portion 32b of the indication element 32 and the negative pole container 15 through the through hole 33b and a through hole 17b. Due to the electric connection, a voltage of the lithium battery 1A would be applied to the indication element 32. The electric potential of the impressed voltage determines the indication which the indication element 32 displays. When voltage drop is caused in a discharging lithium battery 1A, the indication of the indication element 32 changes accordingly. This serves as a clear sign or warning that the lithium battery 1A is running out of its life time (i.e., voltage drop is occurring).

Figure 6:
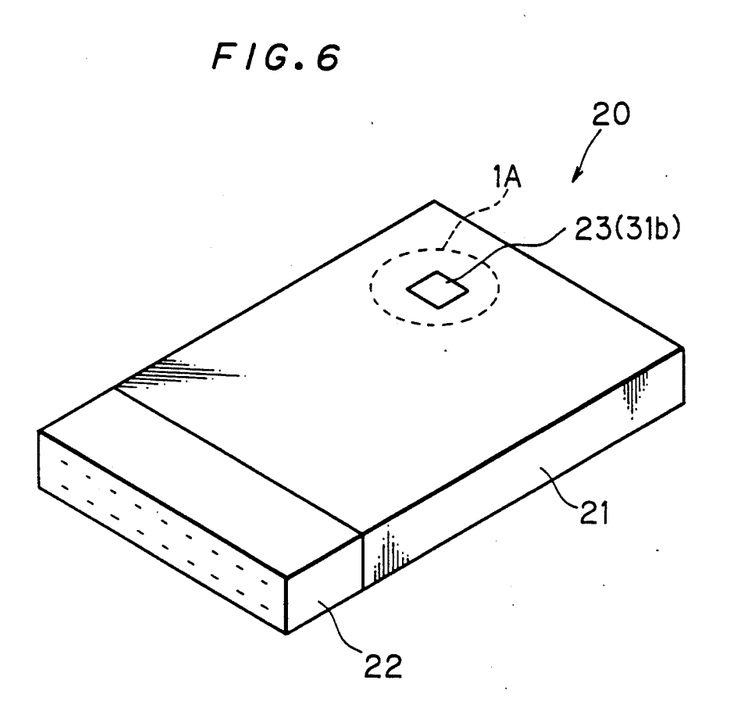
FIG. 6 is a perspective view of a memory card incorporating the battery of FIG. 4.

In most cases, the lithium battery 1A is incorporated in a memory card body 21 to function as a backup power source of a memory card 20 as shown in FIG. 6. The life time indicator 30 directs the opening 31b outside, owing to which the life time indicator 30 can be seen from outside through a window 23 provided in the memory card body 21. Thus, the life time of the lithium battery 1A can be known by observing indications of the indication element 32 without taking out the lithium battery 1A from the memory card 20.

Now, structures and operations of the indication element 32 will be explained. An electrochromism element is one of candidates for the indication element 32. An electrochromism element is characterized in that the color of the material thereof changes according to an impressed voltage. This is called "electrochromism." Well known electrochromism elements are, for example, those made of tungsten oxide. An indication element 32 made of tungsten oxide shows blue color when it receives an impressed voltage, and restores its original color when an impressed voltage is small or zero. By utilizing this characteristic, the life time indication as above can be attained. While the voltage of the lithium battery 1A is relatively large, the indication element 32 is blue. If voltage drop according to discharge occurs in the battery 1A, the indication element 32 loses its blue color, showing that the life time of the lithium battery 1A is running out.

Instead of tungsten oxide, viologen derivative can be used for the indication element 32. Receiving a proper voltage (e.g., 0.5 V or more), a non-colored indication element 32 becomes colored similar to the case where tungsten oxide is used. By partially changing the structure of the viologen derivative, the indication element 32 with a voltage impressed thereon can show various colors such as red, violet, blue and green.

Other materials which exhibit many colors according to an impressed voltage can be used as electrochromism material. For example, ruthenium diphthalocyanine. Ruthenium diphthalocyanine gradually changes its color according to an impressed voltage: purple with an impressed voltage in the range from $-1.5$ V to $-1.0$ V; blue in the range from $-1.0$ to $-0.5$ V; green in the range from $-0.5$ V to $+0.5$ V; reddish brown in the range from $+0.5$ V to $+1.0$ V; and red in the range from $+1.0$ V to $+1.5$ V. Hence, when ruthenium diphthalocyanine is used, it is possible to obtain detailed information about not only the life time but also the voltage of the lithium battery 1A.

Figure 7A:
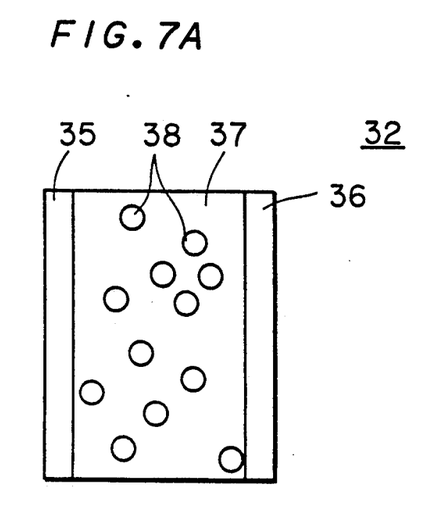
FIGS. 7A and 7B are diagrams of an electrophonetic cell.
Figure 7B:
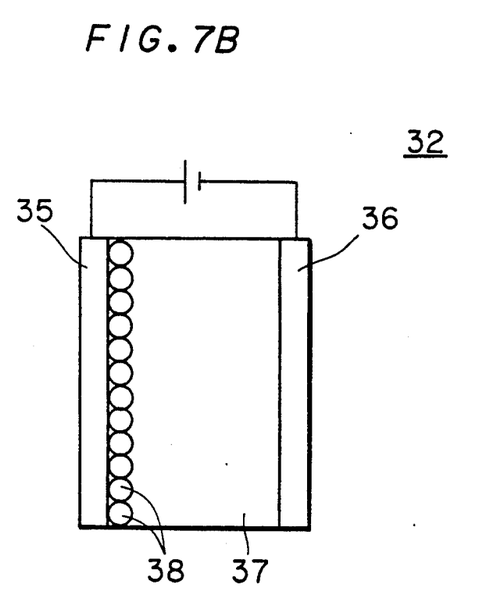

In lieu of electrochromism elements, other elements such as electrophonetic cells and liquid crystal cells may be used as the indication element 32 which has the same effect as the above. FIGS. 7A and 7B are diagrams illustrating an example of the indication element 32 formed by an electrophonetic cell. The indication element 32 consists of a transparent electrode 35 and an electrode 36 sandwiching a solvent layer 37 (e.g., fluorinated oil) in which charged particles 38 are scattered, the charged particles 38 being made of, for example, titanium dioxide coated with a high molecular material. Different colors are assigned to the charged particles 38 and the solvent layer 37. When a voltage is impressed onto the electrodes 35 and 36, the charged particles 38 move toward and gather at the transparent electrode 35 (FIG. 7B). Consequently, the color of the indication element 32 recognized through the transparent electrode 35 changes from the color of the solvent layer 37 to the color of the charged particles 38. The opposite would occur if the lithium battery 1A discharges and the voltage thereof drops. As the charged particles 38 leave the transparent electrode 35 to be scattered in the solvent layer 37 according to the voltage drop, the indication element 32 gradually becomes light colored.

If a liquid crystal cell is employed as the indication element 32, nematic liquid crystal may be used, for instance. With no voltage is impressed thereon, the indication element 32 (i.e., a liquid crystal cell) is bright, whereas it becomes dark when a voltage is impressed on it.

Thus, by utilizing the characteristics as above of electrophonetic cells or liquid crystal cells, it is possible to detect or anticipate the end of the life time of the lithium battery 1A.

Although the foregoing has dealt with the lithium battery 1A comprising the life time indicator 30 completely fitted into the positive pole container 11, the life time indicator 30 may be freely mounted to and dismounted from the positive pole container 11. Now, a lithium battery in which mounting and dismounting of a life time indicator are possible will be described.

Figure 8:
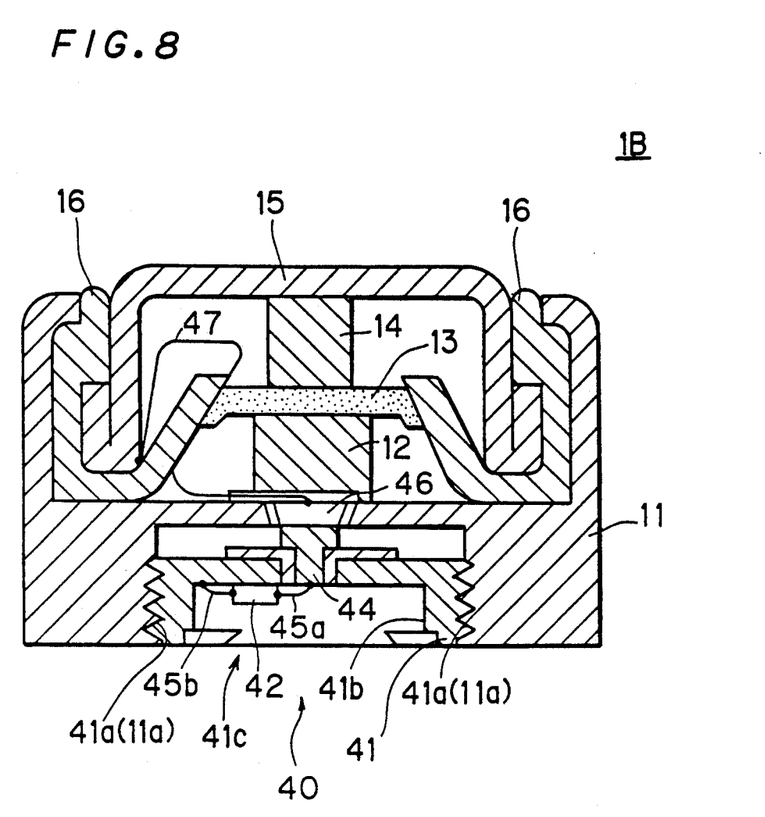
FIG. 8 is a cross sectional view of a battery according to another embodiment of the present invention.

FIG. 8 is a cross sectional view of a battery according to another embodiment of the present invention. In a lithium battery 1B, a life time indicator 40 is mountable to and dismountable from a positive pole container 11. Except this point, lithium battery 1B has approximately the same structures as those of the conventional lithium battery 1 of FIG. 2, and therefore, description of the same is omitted here.

Figure 9:
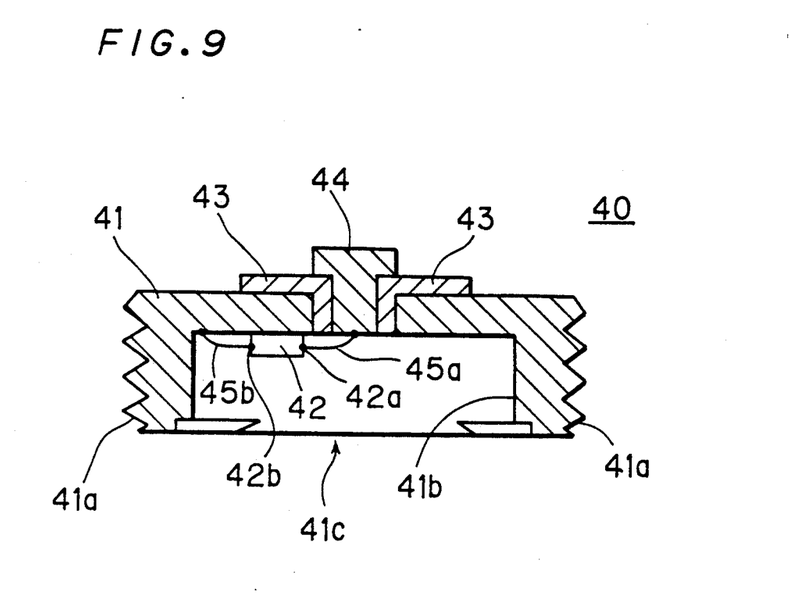
FIG. 9 is a cross sectional view of a life time indicator according to another embodiment of the present invention.
Figure 10:
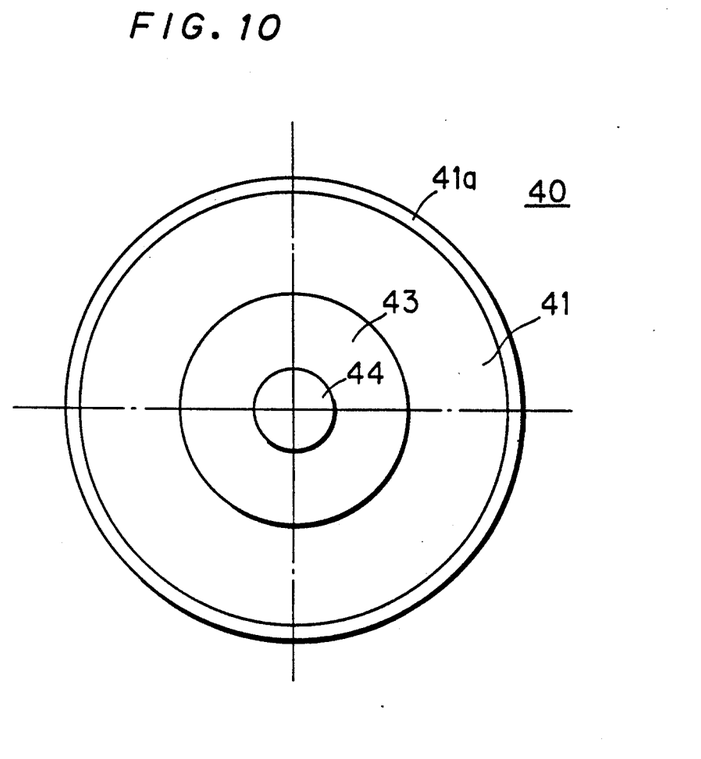
FIG. 10 is a top plane view of the life time indicator of FIG. 9.
Figure 11:
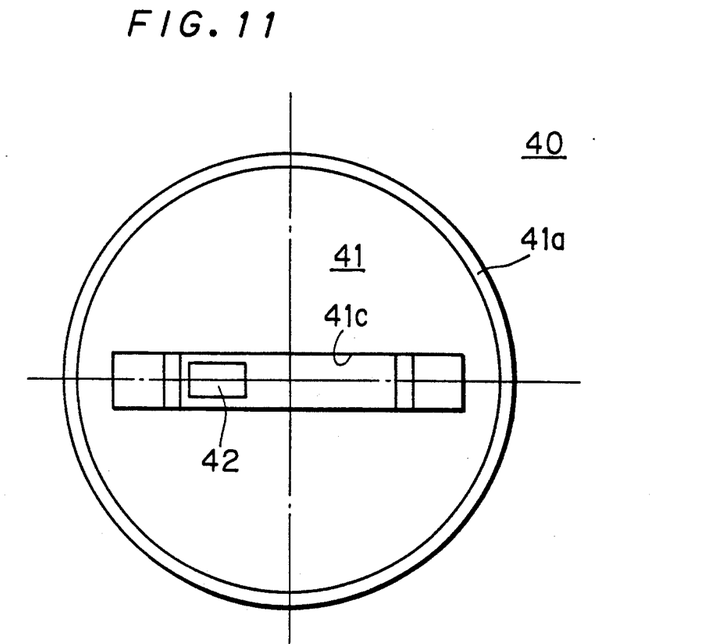
FIG. 11 is a bottom plane view of the life time indicator of FIG. 9.

FIG. 9 is a cross sectional view, FIG. 10 is a top plane view and FIG. 11 is a bottom plane view of the life time indicator 40. The life time indicator 40 includes a cylindrical conductive block member 41. An external thread 41a is formed on the peripheral portion of the conductive block member 41. On the other hand, an internal thread 11a is formed on the side wall of a recess which is provided in the positive pole container 11. The threads 41a and 11a are engageable with each other. Thus, the columnar block member 41 can be mounted to and dismounted from the positive pole container 11.

As shown in FIG. 9, the block member 41 includes a recess 41b with an indication element 42 fixed on its bottom, the indication element 42 consisting of an electrochromism cell, an electrophonetic cell, or a liquid crystal cell described as above. Thus, indications of the indication element 42 can be seen from outside through an opening 41c of the recess 41b. The opening 41c is rectangular in configuration as shown in FIG. 11. By turning a coin or the like inserted into the rectangular opening 41c, the block member 41 is dismounted from the positive pole container 11.

The block member 41 is provided with a hole at the center portion of the bottom of the recess 41b (FIG. 9). An insulating seal member 43 is inserted in the hole. In the insulating seal member 43, a conductive block member 44 is inserted. Thus, the conductive block member 44 is fixed to the block member 41 while being insulated from the block member 41. The conductive block member 44 is electrically connected to the indication element 42 by a lead wire 45a connecting the same and an end portion 42a of the indication element 42. When integrated and fitted in the positive pole container 11, the conductive block member 44 becomes electrically connected to an electrode 46 (FIG. 8). The electrode 46 is fixed to the positive container 11 such that it is insulated from both the positive container 11 and a positive pole 12. In addition, the electrode 46 is electrically connected to a negative pole container 15 by means of a covered lead wire 47. Hence, when the block member 41 is mounted to the positive pole container 11, the end portion 42a of the indication element 42 becomes electrically connected to the negative pole container 15 through the lead wire 45a, the conductive block member 44, the electrode 46 and the lead wire 47. On the other hand, another end portion 42b of the indication element 42 is connected to the block member 41 by a lead wire 45b. Hence, mounting of the block member 41 to the positive pole container 11 makes the indication element 42 electrically connected to the block member 41. Owing to this, when the voltage of the lithium battery 1B is applied to the indication element 42, the indication element 42 shows indication corresponding to the applied voltage. Thus, by observing changes in indications of the indication element 42, the life time of the lithium battery 1B is known. The lithium battery 1B is still further advantageous. Since the life time indicator 40 can be freely mounted and dismounted, it is possible that the indication element 40 is not mounted except when voltage drop needs to be measured. Hence, the life time indicator 40 causes only minimum discharge of the battery 1B.

The foregoing relates exclusively to lithium batteries, however, the present invention has a broader applicable field. The present invention can be applied to primary batteries such as manganese batteries and secondary batteries such as nickel cadmium batteries.

Instead of mounting to the positive pole container, the life time indicator can be mounted to the negative pole container. In addition, the life time indicator does not necessarily have to be mounted to the bottom portion of the container, but can be mounted to the top or the side portion of the container.

While the invention has been shown and described in detail, the foregoing description is in all aspects illustrative and not restrictive. It is understood that numerous other modifications and variations can be devised without departing from the scope of the invention.

What is claimed is:

1. A battery, comprising:
    a battery unit including a power source for generating electric power, positive and negative containers connected to said power source, and an insulating member inserted between said positive and negative containers for attaining insulation therebetween; and
    a lifetime indicator, provided on said battery unit for indicating the lifetime of said battery unit, comprising
    an indication element having first and second electrodes, said indication element having a characteristic for indicating changes in the indication element according to a voltage difference between said first and second electrodes,
    first connection means for connecting said first electrode to said positive container, and
    second connection means for connecting said second electrode to said negative container,
    wherein said indication element is made of a liquid crystal material.

2. A battery, comprising:
    a battery unit including a power source for generating electric power, positive and negative containers connected to said power source, and an insulating member inserted between said positive and negative containers for attaining insulation therebetween; and
    a lifetime indicator, provided on said battery unit for indicating the lifetime of said battery unit, comprising an indication element having first and second electrodes, said indication element having a characteristic for indicating changes in the indication element according to a voltage difference between said first and second electrodes, first connection means for connecting said first electrode to said positive container, and second connection means for connecting said second electrode to said negative container, wherein said indication element is made of an electrochromism element, said electrochromism element including ruthenium diphthalocyanine.

3. A battery, comprising:

a battery unit including a power source for generating electric power, positive and negative containers connected to said power source, and an insulating member inserted between said positive and negative containers for attaining insulation therebetween; and a lifetime indicator, provided on said battery unit for indicating the lifetime of said battery unit, comprising an indication element having first and second electrodes, said indication element having a characteristic for indicating changes in the indication element according to a voltage difference between said first and second electrodes, first connection means for connecting said first electrode to said positive container, and second connection means for connecting said second electrode to said negative container, wherein said indication element is made of a viologen derivative.

4. A battery, comprising:

a battery unit including a power source for generating electric power, positive and negative containers connected to said power source, and an insulating member inserted between said positive and negative containers for attaining insulation therebetween; and a lifetime indicator, provided on said battery unit for indicating the lifetime of said battery unit, comprising an indication element having first and second electrodes, said indication element having a characteristic for indicating changes in the indication element according to a voltage difference between said first and second electrodes, first connection means for connecting said first electrode to said positive container, and second connection means for connecting said second electrode to said negative container, wherein said indication element is made of an electrophonetic cell.

5. A battery in accordance with claim 4, wherein said first electrode is a transparent one, and said electrophonetic cell comprises a solvent layer provided between said first and second electrodes and a plurality of charged particles scattered in said solvent layer.

6. A battery in accordance with claim 5, wherein each of said charged particles comprises particles of titanium oxide coated with a high molecular weight material.

7. A battery, comprising:

a battery unit including a power source for generating electric power, positive and negative containers connected to said power source, and an insulating member inserted between said positive and negative containers for attaining insulation therebetween; and a lifetime indicator, provided on said battery unit for indicating the lifetime of said battery unit;

wherein said lifetime indicator is freely mounted to and dismounted from said battery unit and has an external thread portion, while said battery unit has an internal thread portion, said external and internal thread portions being engageable with each other.

8. A battery in accordance with claim 7, wherein said life time indicator has a rectangular opening.

* * * * *